Patented Jan. 24, 1933

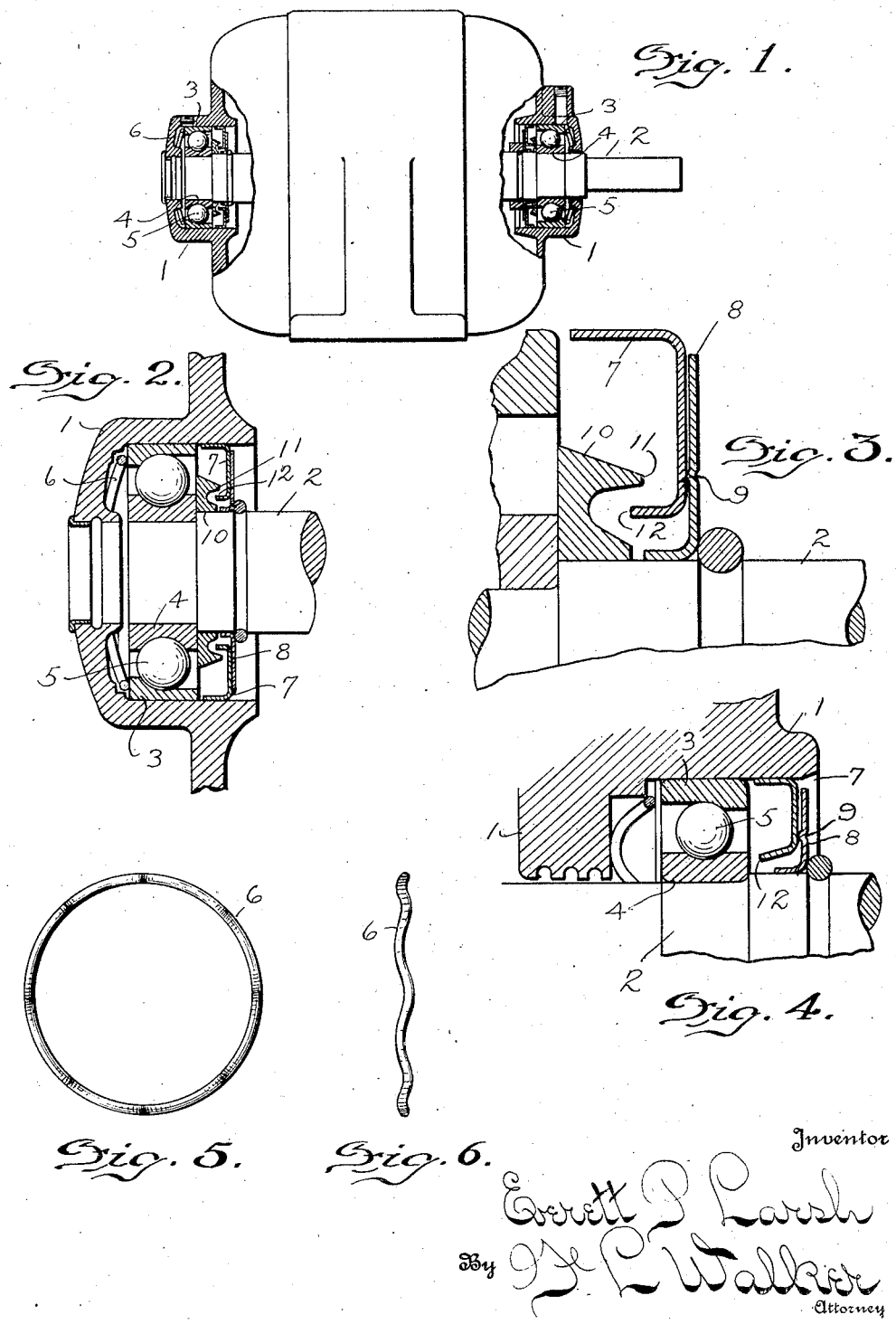

1,895,288

UNITED STATES PATENT OFFICE

EVERETT P. LARSH, OF DAYTON, OHIO, ASSIGNOR TO THE MASTER ELECTRIC COMPANY, OF DAYTON, OHIO, A CORPORATION OF OHIO

BEARING MOUNTING

Application filed August 24, 1927. Serial No. 215,219.

My invention relates to bearings for revoluble shafts, and the like, and more particularly to guard means for preventing entrance of dust and dirt to the bearings and to likewise prevent the escape of lubricant therefrom.

While the present construction has been designed more especially for use in electric motors it is to be understood that it is not limited to such application. As illustrated in the accompanying drawing the present invention embodies a channel shaped guard ring stationarily mounted within the structure frame and concentric with the revoluble shaft, closely adjacent to which, but preferably slightly spaced therefrom extends an overlapping disc carried by the revoluble shaft. The shaft also preferably carries a flanged ring overlapping the inner flange or wall of the channel shaped guard ring but spaced therefrom. Such overlapping flanged ring serves as a collecting ring for lubricant, which by centrifugal influence is discharged outwardly within the channel shaped guard member and prevented from escaping intermediate such member and the disc.

The object of the invention is to simplify the structure as well as the means and mode of operation of protecting shaft bearings against the entrance of foreign material and the escape of lubricant whereby such guard means will not only be cheapened in construction, but more efficient in use, positive in operation, uniform in its action, easily applied and unlikely to get out of repair.

A further object of the invention is to provide relatively movable guard members arranged in overlapping relation and to provide overlapping flanges protecting the space between such relatively movable guard members and to further provide centrifugal means for repelling lubricant which might otherwise escape between such guard members.

With the above primary and other incidental objects in view, as will more fully appear in the specification, the invention consists of the features of construction, the parts and combinations thereof, and the mode of operation, or their equivalents, as hereinafter described and set forth in the claims.

Referring to the accompanying drawing, wherein is shown the preferred, but obviously not necessarily the only form of embodiment of the invention, Fig. 1 is a side elevation of an electric motor partially broken away to show in section the armature shaft bearings to which the present invention has been applied. Fig. 2 is a longitudinal sectional view of a rotary shaft bearing embodying the present invention. Fig. 3 is an enlarged detail view thereof, and Fig. 4 is an enlarged detail view of a modification of the construction shown in Figs. 2 and 3. Figs. 5 and 6 are detail views of a spring ring or collar for maintaining tension upon the ball bearing.

Like parts are indicated by similar characters of reference throughout the several views.

Referring to the drawing, 1 is the bearing hub formed integral with the machine frame or motor housing as the case may be. Within the hub 1 is a ball bearing unit in which is mounted a rotary shaft 2 which in the present instance is the armature shaft. The ball bearing comprises the cup 3 which is preferably loosely mounted within the hub 1, the ball race 4 preferably tightly pressed upon the rotary shaft 2, and the intermediate bearing balls 5. The cup 3 is preferably maintained under slightly yielding pressure of a spring collar or ring 6 which bears upon the ball cup 3 with sufficient pressure to maintain a close relation between the ball cup and bearing balls 5 but sufficiently yielding to compensate for end thrust of the shaft 2.

Pressed within the hub 1 at the inner side of the ball bearing structure is a channel shaped guard ring 7 having its flanged margins directed toward the bearing. This channel shaped guard ring 7 is stationary within the bearing hub. The inner flanged margin of the guard ring 7 is concentric with but spaced away from the periphery of the shaft 2. Carried by the shaft 2 at the inner side of the guard ring 7 is a disc like collar 8 extending in parallel relation with the guard ring 7. To prevent capillary flow of lubricant between the disc or collar 8 and the guard ring 7 these members are preferably spaced slightly apart. To insure such spacing one or the other of such members is provided with a slight offset or bead 9 engaging with the other member and maintaining the relatively spaced relation of such parts. The disc like collar 8 rotates in unison with the shaft 2. While these parts 7 and 8 are closely spaced they are not so close as to induce capillary flow of lubricant but are sufficiently close to prevent the entrance of dust and dirt. Moreover, any dust or dirt collecting upon the disc 8 will have a tendency to travel outward toward the outer periphery of such disc under centrifugal influence, rather than inwardly into the bearing compartment.

Preferably, though not necessarily mounted upon the shaft 2 within the bearing chamber or compartment is a flanged ring 10 having a laterally projecting flange 11 overhanging in spaced relation the inner marginal flange 12 of the guard ring 7. This flange 11 of the ring or collar 10 is preferably beveled or inclined in opposite directions, thus tending to drain or lead any lubricant collecting thereon toward the margin of such flange. As the shaft 2 rotates at a high velocity the lubricant collected upon the flange 11 of the collar 10 and also any which may drip onto flange 12 is thrown therefrom outwardly within the bearing chamber or compartment by centrifugal influence. The overlapping relation of the flanges 11 and 12 together with centrifugal influence when the shaft is in rotation prevents any accumulation of oil or lubricant intermediate the flange 12 and the periphery of the shaft so that such lubricant cannot reach the entrance to the space intermediate the guard ring 7 and disc like collar 8. While the centrifugal distributor ring 10 is desirable, and is the preferable construction, it is not essential. The stationary channel shaped guard ring 7 coacting with the rotary disc like collar 8 are alone sufficient to protect the bearing from the entrance of dirt and foreign material and also to prevent the escape of lubricant. Such construction has been illustrated in Fig. 4. The shoulder 13 of the mounting forms a stop for the bearing unit which is free for limited axial movement within the mounting 1 and thereby prevents complete collapse or compression of the undulating spring ring 6. While the bearing unit is shown and described as a ball bearing, it is to be understood that it is not so limited but a conventional roller bearing may be substituted, and in fact is so now employed in actual practice.

From the above description it will be apparent that there is thus provided a construction of the character described, possessing the particular features of advantage before enumerated as desirable but which obviously is susceptible of modification in its form, proportions, and arrangement of parts, without departing from the principle involved or sacrificing any of its advantages.

While in order to comply with the statute the invention is described in language more or less specific as to structural features, it is to be understood that the invention is not limited to the specific details shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. The combination with a rotary shaft, a mounting therefor, and a bearing therein for said shaft, of a pair of overlapping guard members located in parallel spaced relation and carried by the shaft and mounting respectively, the shaft carried member having an annular groove in its outer lateral face, the mounting carried member having an inwardly projecting flange extending within the annular groove of the first member in spaced relation with the sides and bottom thereof, and a tortuous passage intermediate said members affording open and unrestricted access radially past said flange.

2. The combination with a rotary shaft, a mounting therefor, and a bearing therein for said shaft, of a channel shaped annular guard ring carried by the mounting surrounding the shaft in spaced relation thereto and arranged with its concave side toward the bearing and a reversely channeled collar carried by the shaft having therein an arcuate channel in the side opposite the bearing, the periphery of the collar being tapered toward such channel.

3. The combination with a rotary shaft, a mounting therefor, and a bearing therein for said shaft, of a collar carried by the shaft and a laterally disposed tapered annular flange carried by the collar in concentric spaced relation with the shaft and a second collar stationarily supported within said mounting and a flange carried by the stationary collar projecting in axially overlapping relation with said tapered flange and interiorly thereof.

4. The combination with a rotary shaft, a mounting therefor, and a bearing therein for said shaft, of a guard ring carried by the mounting, a lateral flange at the inner margin of the ring in concentric spaced relation with the shaft, and a pair of collars carried in spaced relation by the shaft intermediate which the flanged margin of the ring extends, a laterally projecting flange upon one of the collars overhanging the flange of the guard ring, and an annular bead upon the other collar making contact with the face of the ring opposite that from which the flange projects.

5. The combination with a rotary shaft, a mounting therefor, and a bearing therein for said shaft, of a stationary annular guard ring, a lateral flange at the inner margin of the annular ring projecting toward the bearing, and a collar carried by the shaft having a tapered marginal surface converging toward the stationary guard ring, and having in its face adjacent to said ring an annular groove registering with the laterally projecting flange of said guard ring which extends in parallel spaced relation with the margins of said groove.

In testimony whereof I have hereunto set my hand this 10th day of August A. D. 1927.

EVERETT P. LARSH.